United States Patent [19]

Mirtain

[11] 4,065,338
[45] Dec. 27, 1977

[54] RAW PNEUMATIC TIRE CARCASS AND METHOD OF FABRICATING SAME

[75] Inventor: Henri J. Mirtain, Compiegne, France

[73] Assignee: Uniroyal, Clairoix, France

[21] Appl. No.: 628,453

[22] Filed: Nov. 3, 1975

Related U.S. Application Data

[62] Division of Ser. No. 509,523, Sept. 28, 1974, Pat. No. 3,948,304.

[30] Foreign Application Priority Data

Oct. 5, 1973  France .................... 73.35763

[51] Int. Cl.$^2$ .................................. B29H 17/02
[52] U.S. Cl. ..................... 156/123 R; 156/286; 264/326; 425/44
[58] Field of Search ............... 156/87, 110 R, 123 R, 156/285–287, 118–122; 152/330 R, 351, 354, DIG. 16, 330, 355, 347; 425/31, 44, 45; 264/326

[56] References Cited

U.S. PATENT DOCUMENTS

| | | | |
|---|---|---|---|
| 1,392,576 | 10/1921 | Goodenberger | 156/87 |
| 1,504,653 | 8/1924 | Taylor | 156/122 |
| 1,613,089 | 1/1927 | Ellinwood | 156/118 |
| 2,541,506 | 2/1951 | Cuthbertson et al. | 156/87 |
| 2,566,384 | 9/1951 | Tilton | 152/347 |
| 2,645,265 | 7/1953 | O'Neil | 152/354 |
| 2,650,642 | 9/1953 | Reheiser | 156/87 |
| 3,143,155 | 8/1964 | Knox | 152/330 R |
| 3,311,517 | 3/1967 | Keslar et al. | 156/286 |
| 3,414,036 | 12/1968 | Skidmore | 152/330 R |
| 3,532,590 | 10/1970 | Priddle | 156/104 |

OTHER PUBLICATIONS

*Rubber Technology and Manufacture* edited by Blow CRC Press, Cleveland, Ohio, 1971, pp. 349–356.

*Primary Examiner*—Charles E. Van Horn
*Assistant Examiner*—John E. Kittle
*Attorney, Agent, or Firm*—Jeffrey M. Greenman

[57] ABSTRACT

A raw pneumatic tire carcass having an uncured, elastomeric, annular body and an uncured, elastomeric, liner superposed upon and affixed to the internal surface of the body, is disclosed. The liner in one form thereof includes bead-communicating recesses for venting fluid from between the liner and an inflatable bladder used in a mold for effecting inflation of the body and liner from a cylinder to a torus. The liner in the latter form is constituted of an appropriate thermoplastic material which, when engaged and inflated by a smooth surface of the bladder and vulcanized, undergoes a transformation in which the recesses gradually disappear substantially and are transformed into a correspondingly smooth surface. A second form of the liner (which is preferably incorporated as part of the first said form of the liner) is represented by a convexity on at least one surface of the liner. The convexity serves to prevent an excessive reduction in thickness that the liner otherwise undergoes in the crown region thereof when inflated from a cylinder to a torus.

3 Claims, 17 Drawing Figures

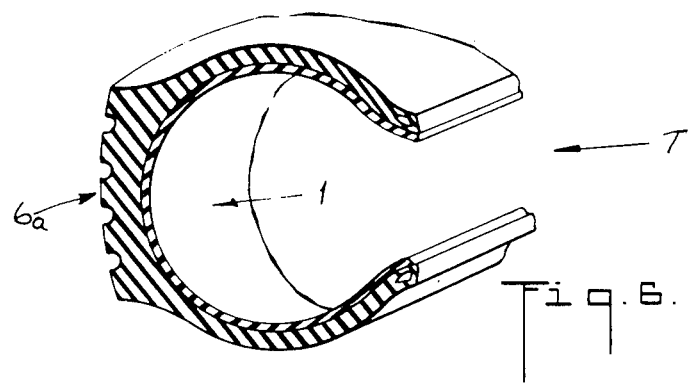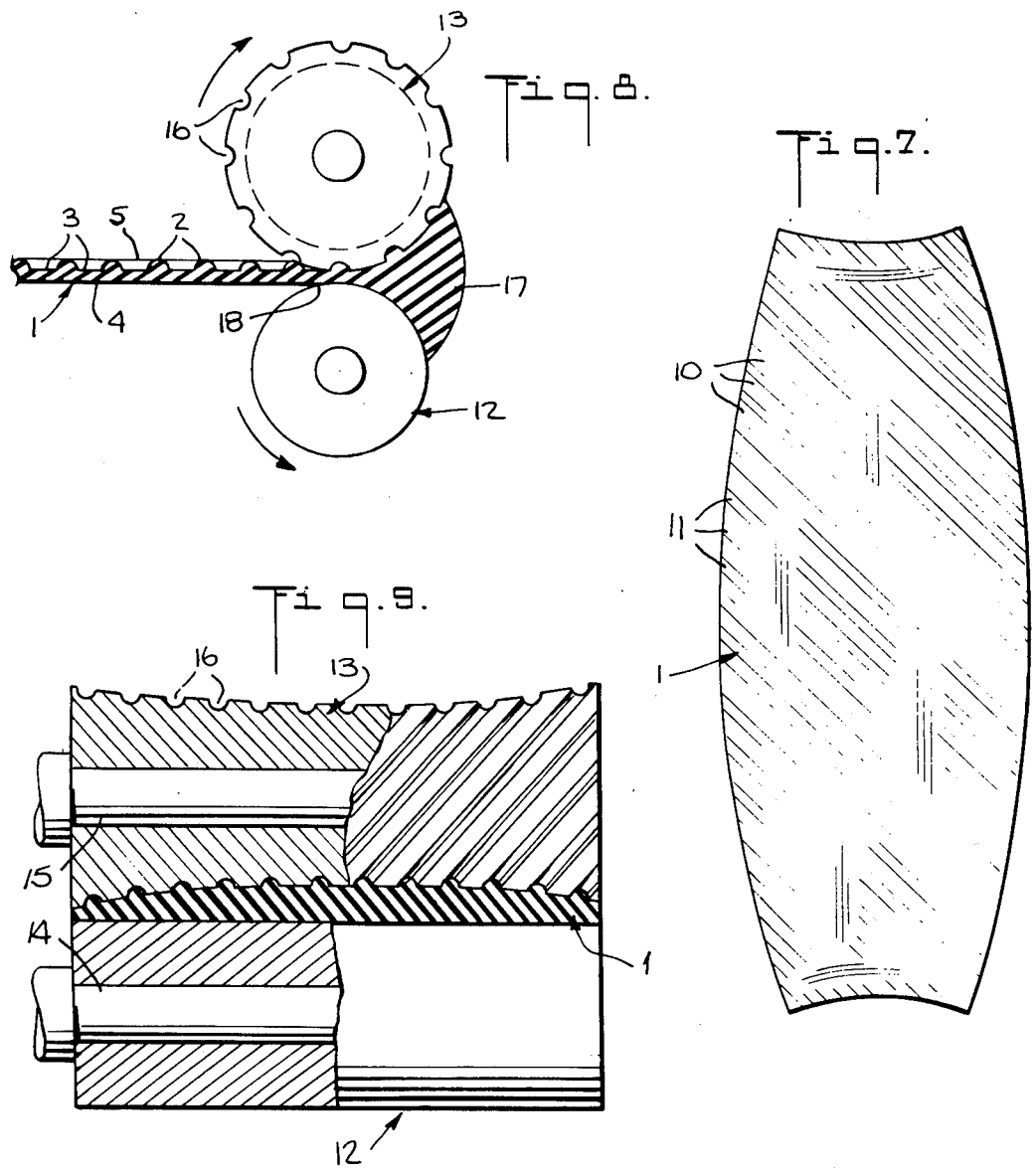

RAW PNEUMATIC TIRE CARCASS AND METHOD OF FABRICATING SAME

This is a division, of application Ser. No. 509,523, filed Sept. 28, 1974, now U.S. Pat. No. 3,948,304.

BACKGROUND OF THE INVENTION

The present invention relates generally to pneumatic tires, and more particularly to a raw pneumatic tire carcass and a method of fabricting same.

One problem confronting tire manufacturers in the course of fabricating raw tire carcasses, of either the "radial" ply variety or the "bias" ply variety, relates to a weakening or deterioration of the raw carcass when it is inflated from a cylinder to a torus and vulcanized in a toroidal mold. This problem is due to air-entrapment between the interior of the carcass and the outer surface of the bladder in the mold for inflating the carcass into a torus.

A second problem involves the reduction in thickness that the air-impervious carcass liner undergoes in the vicinity of the median equatorial plane thereof when the carcass (of the so-called "tubeless" tire variety) is inflated from a cylinder to a torus, and the resultant loss in the capacity of the liner to effectively resist the permeation or flow of air therethrough.

The problem of air-entrapment is the concern of U.S. Pat. No. 3,143,155 issued on Aug. 4, 1964 to H. W. Knox, in which there is disclosed means for evacuating air or other fluids tending to collect between the carcass-inflating bladder and the interior of the carcass in a mold. This is accomplished by the provision of grooves or small passageways extending along the internal surface of the carcass and acting to direct the outflow or egress of fluid or air confined between the bladder and interior of the carcass. Complete air evacuation, however, is not necessarily insured simply by the principles established in the aforementioned patent.

The problem relating to the reduction in thickness that the air-impervious liner undergoes when inflated into a torus is generally overcome by fabricating the liner with an increased thickness to allow for the thinning thereof when inflated. The thicker liner better resists the permeation of air therethrough, but is more costly and bulky than necessary.

SUMMARY OF THE INVENTION

Accordingly, it is the object of the present invention to provide a novel raw pneumatic tire carcass, and a novel method of fabricating same, which optimizes the evacuation of air tending to collect between the interior of the carcass and a mold-confined bladder for inflating the carcass from a cylinder to a torus.

It is another object of the present invention to provide a novel raw pneumatic tire carcass, and a novel method of fabricating same, which incorporates a liner for effectively and inexpensively preventing the permeation of air therethrough despite the reduction in thickness that it undergoes in its crown region when inflated into a torus.

It is a further object of the present invention to provide a novel raw pneumatic tire carcass, and a novel method of fabricating same, which employs a liner effective as a cushion for preventing chafing of an inner tube confined in a so-called "radial ply tubed" tire by the somewhat protuberant carcass cords upon flexing of the tire sidewalls when driven.

With the above objects in view, the present invention relates to a raw pneumatic tire carcass, and a method of fabricating same, the carcass including an uncured, elastomeric, bead-reinforced, annular body and an uncured elastomeric liner superposed upon and affixed to the internal surface of the body. The liner extends from bead to bead and is preferably provided with at least one convex surface which is exposed relative to the interior of the body so that when the body and liner are together inflated into a torus each undergoes a re-distribution in thickness wherein the liner presents substantially uniform thickness no less than that which is acceptable for ensuring that the liner remains impervious to air.

The convex surface of the liner may be, and preferably is, provided with means defining conduits or passageways, i.e. grooves, etc., for venting fluid from between the liner and a mold-confined bladder utilized for inflating the carcass into a torus. Preferably, the liner is constituted of a thermoplastic material which, when engaged and inflated by a smooth surface of the bladder and vulcanized in the mold, undergoes a transformation in which the grooves, etc., gradually disappear substantially and are transformed into a correspondingly smooth surface. In this manner, as the grooves disappear under the pressure offered by the smooth surface of the bladder, the air entrapped between the liner and the bladder is "effectively" squeezed along the disappearing grooves of the carcass and expelled therefrom.

BRIEF DESCRIPTION OF THE DRAWINGS

The above and additional advantages of this invention will be more clearly understood from the following detailed description when read in conjunction with the accompanying drawings, in which:

FIG. 6 is a fragmentary, perspective view of a cured carcass after its removal from the mold illustrated in FIG. 5;

FIG. 7 is a development view of the deformed or "ironed out" liner as viewed in the direction of arrow T in FIG. 6;

FIG. 8 is a schematic, side elevational view of apparatus for fabricating the liner of FIG. 1;

FIG. 9 is a partially fragmentary, cross-sectional view of a further apparatus embodiment for fabricating the liner of FIG. 1;

DETAILED DESCRIPTION OF THE INVENTION

Figure 1:
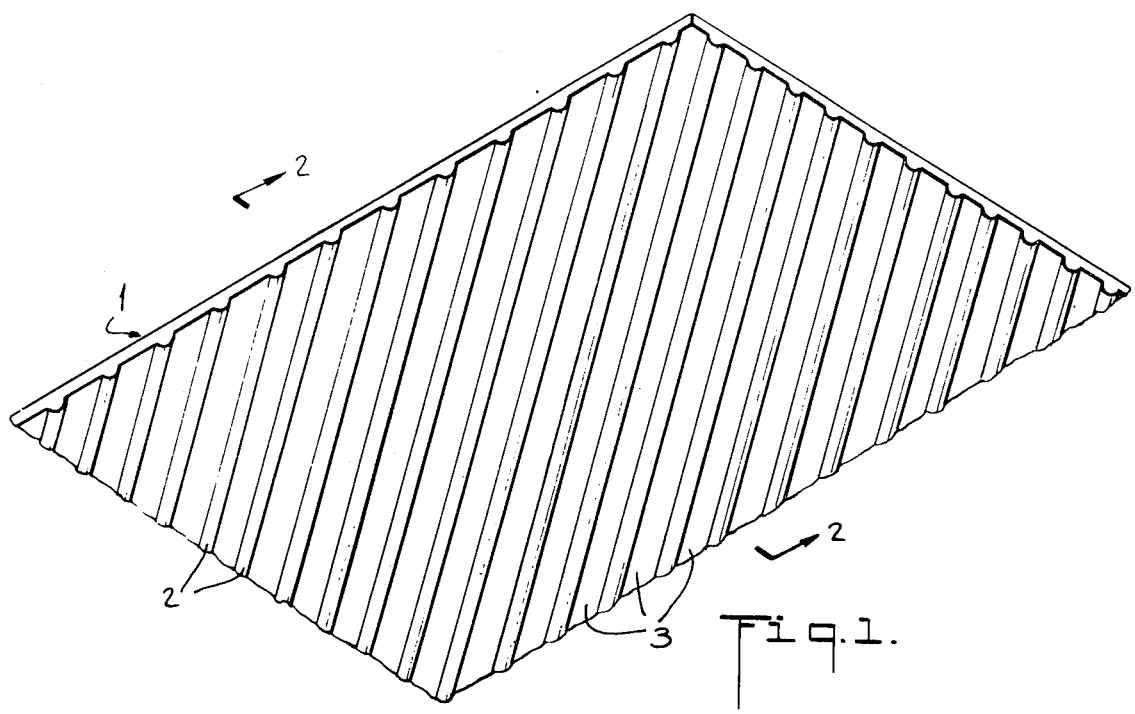
FIG. 1 is an enlarged, fragmentary, perspective view llustrating the underside of a preferred form of the liner pursuant to the present invention.
Figure 2:
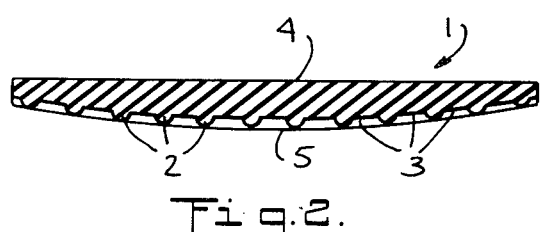
FIG. 2 is a cross-sectional view taken along the line 2—2 in FIG. 1.

Referring now to the drawings, and more particularly to FIGS. 1 and 2, the present invention relates generally to a pneumatic tire inner liner denoted by the reference character 1. The liner 1 is in the form of an uncured "thermoplastic" sheet (as distinguished from "thermosetting") and is provided with spaced, parallel ribs 2 between which are defined respective elongate passageways or recesses 3. The liner 1 is constituted, for example, of natural and/or synthetic rubber materials, and preferably includes at least in part, chlorobutyl and/or bromobutyl elastomers. The liner 1 is preferably designed for, although not necessarily, tubeless pneumatic tires and is, therefore, preferably impervious to air.

Figure 3:
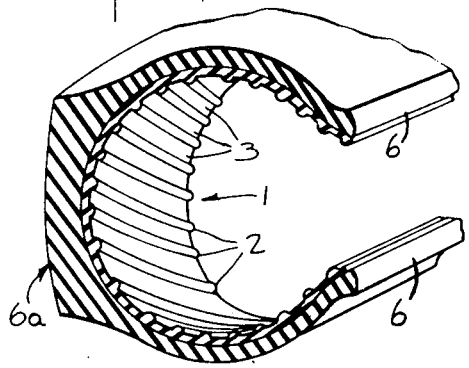
FIG. 3 is a fragmentary, perspective view of a raw carcass pursuant to the embodiment of FIG. 1.

In cross-section, as illustrated in FIG. 2, the liner 1 is preferably, although not necessarily, provided with a flat surface 4 and a generally convex surface 5. Along the convex surface 5, there are presented the elongate ribs 2 defining the passageways 3 therebetween. The flat surface 4 of the liner 1 is adapted to be superposed along and affixed to the interior of a substantially cylindrical body of a raw or uncured carcass for transformation into a pneumatic tire. The liner 1 may be utilized with either a "radial" ply carcass or a "bias" ply carcass and is affixed to, or built together with, either such carcass during the cylindrical fabrication of the carcass on an appropriate drum. The liner 1 has an axial extent which preferably bridges the bead regions 6 of the carcass body (FIG. 3), the ribs 2 being inclined relative to and communicating with the bead regions 6. In either instance, the carcass body and liner 1 may be then inflated into the form of a torus denoted generally by the reference character 6a in FIG. 3 and vulcanized in a mold 7 illustrated generally in FIGS. 4 and 5. Inflation of the carcass body and liner 1 into the form of a torus in the mold 7 is effected (of course, after the carcass body is provided with appropriate breaker plies and a tread) by means of an inflatable bladder 8 having a smooth outer surface adapted to engage the elongate ribs 2 of the liner 1 during inflation.

As steam is injected under pressure into the inflatable chamber 9 of the bladder 8, thereby causing the inflatable bladder to assume the formation of a torus and engage the ribs 2 of the liner 1, fluid or air entrapped between the smooth surface of the bladder 8 and the liner 1 is forced along the passageways 3 to the bead regions 6 and outwardly from between the bladder 8 and the liner 1. Such fluid flow or fluid venting obviates potential damage to the tortoidal carcass 6a since the fluid, in the absence of being vented by the passageways 3, would otherwise tend to deteriorate the toroidal carcass 6a during vulcanization thereof.

A principal of the present invention is founded in the concept of evacuating as much air or fluid as possible from between the bladder 8 and the liner 1. In furtherance of this principal, the liner 1 is constituted of a thermoplastic material which is in an uncured condition when affixed to the interior of the carcass. Accordingly, when the composite toroidal body 6a and liner 1 are subjected to the heat of vulcanization within the confines of the mold 7, and the readily deformable ribs 2 of the liner 1 are subjected to the pressure of the smooth surface of the bladder 8, the ribs 2 tend to deform and fill the recesses 3, thereby forcing any air or fluid remaining between the bladder 8 and the liner 1 outwardly therefrom as the ribs 2 gradually deform.

Figure 4:
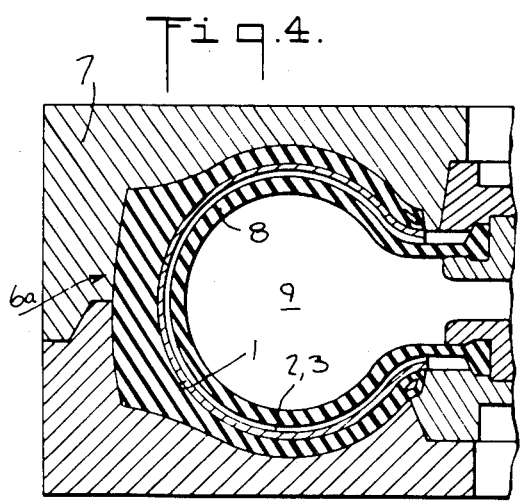
FIG. 4 is a fragmentary, vertical cross-sectional view of a mold and bladder for vulcanizing the carcass of FIG. 3, and illustrates the carcass and liner prior to complete deformation of the elongate ribs thereof by the bladder.
Figure 5:
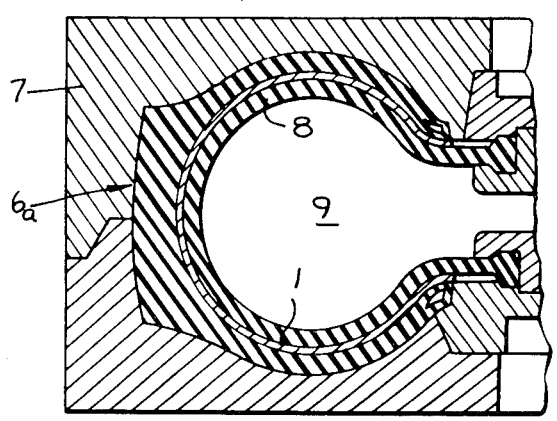
FIG. 5 is a view similar to FIG. 4, but illustrates the condition of the liner after deformation or "ironing out" of the ribs thereof by the bladder.
Figure 10:
FIGS. 10—14 are cross-sectional views of respective other embodiments of the liner pursuant to the present invention.
Figure 11:
Figure 12:
Figure 13:
Figure 14:

The deformation of the ribs 2 is illustrated generally in FIGS. 4 and 5, FIG. 4 illustrating an annular space 2,3 representing the ribs 2 prior to deformation, FIG. 5 illustrating the absence of the space 2,3 and complete deformation of "ironing out" of the ribs 2. FIG. 6 illustrates the finally cured pneumatic tire after its removal from the mold 7 and in a condition wherein the liner 1 presents a substantially smooth or "ironed out" surface corresponding to the smooth contour of the external surface of the bladder 8.

It is a common expedient to utilize a lubricant between the bladder 8 and the liner 1 to facilitate their ready separation and removal of the carcass 6a from the mold 7 after vulcanization. When a lubricant is utilized, the smooth surface of the liner 1, exposed to the interior of the carcass 6a, displays a plurality of elongate striations of light and dark tone 10 and 11, respectively, alternating with one another. These striations 10 and 11 may be observed in the development view of FIG. 7. The lighter tone striations 10 correspond to the locations of the passageways 2 along which there was a greater accumulation of lubricant, whereas the striations 11 of darker tone correspond to the locations of the deformed ribs 2 along which there was a lesser accumulation of lubricant. Thus, when utilizing a lubricant, one can readily identify from the striations the degree to which the pneumatic tire was fabricated in accordance with the above described deformable-rib principle of the present invention.

A second principle pursuant to the present invention, and one which is concomitantly associated with the aforementioned "deformable-rib" principle, lies in the provision of a convexity in the cross-sectional contour of the liner 1. In this respect, when a carcass in cylindrical form, as initially fabricated, is inflated, toroidally or otherwise, the carcass and liner undergo a reduction in its thickness which is most severe in the region of its median equatorial plane. As a result, the liner presents a thinner region through which air may flow, permeate or otherwise leak. Accordingly, by providing the liner 1 with a convexity which is thickest in the central area thereof, namely the region thereof which corresponds to the median equatorial plane of the carcass 6a, as the liner 1 is inflated with the carcass 6a from a cylinder to a torus, each stretches from bead to bead and undergoes a re-distribution in thickness such that the inflated liner 1, although thinner, has an "effective" substantially uniform thickness no less than that which is acceptable for it to remain impervious to air.

A means or apparatus for shaping the liner 1 such that it presents both a convex cross-section and a surface (preferably the convex surface) with the spaced, parallel, elongate ribs 2 thereupon, is illustrated generally in FIGS. 8 and 9. The apparatus includes a pair of opposing calendering rolls 12 and 13. The rolls 12 and 13 are supported for rotation upon respective shafts 14 and 15. The lower roll 12 is provided with a substantially smooth cylindrical periphery, whereas the upper roll 13 is provided with a converging-diverging cross-section having spaced, parallel grooves 16 formed axially in its periphery. It will be understood that the embodiment of FIG. 9 differs from the embodiment of FIG. 8 with respect to the direction that the grooves 16 extend. In FIG. 9, the grooves 16 extend substantially circumferentially of the roll 13.

In either instance, uncured elastomeric stock 17 is fed across the nip 18 defined by the opposing rolls 12 and 13 and emerges in the form of the convex liner sheet 1 illustrated generally in FIG. 2. The sheet emerging from the nip 18 may then by appropriately severed to correspond in size (from bead-to-bead) with the desired size of the cylindrical carcass upon whose internal surface it will be superposed and affixed to.

Accordingly, the composite of the carcass 6a and liner 1, when inflated from a cylinder to a torus prior to vulcanization, undergoes a re-distribution in thickness so that the entire cross-sectional extent thereof, from bead-to-bead, remains substantially unweakened despite the reduction in thickness that the body of the carcass undergoes in the vicinity of its median equitorial plane. Moreover, as the composite of the carcass 6a and liner 1 is vulcanized and inflated from a cylinder to a torus, air or other undersireably trapped fluid is evacuated from between the bladder 8 and the liner 1, the evacuation being assisted by the "ironing out" deformation of the ribs 2 and the transformation thereof into a smooth surface corresponding to the smooth surface presented by the exterior of the bladder 8 engaged therewith.

It will be understood that although the liner 1 has been described and illustrated as being provided with elongate ribs 2 which define elongate passageways 3 therebetween, the liner 1 may be provided with any number of patterns or designs in which there is defined passageways communicating one edge of the liner with a second edge thereof for purposes of venting fluid from bead-to-bead.

It will also be understood that pursuant to the aforementioned second principle of the present invention, namely the provision of the convex cross-section, such convexity may take the form of any of the embodiments illustrated in FIGS. 10-14 respectively, with or without venting passageways. For example, the convexity may be in the form of the triangular cross-section 1A illustrated in FIG. 10, the trapazoidal cross-section 1B illustrated in FIG. 11, the rounded cross-section 1C terminating in opposite blunt edges illustrated in FIG. 12, the rounded cross-section 1D terminating in opposite sharp edges illustrated in FIG. 13, or the rounded cross-section 1E illustrated in FIG. 14 wherein both surfaces are convex.

Figure 15:
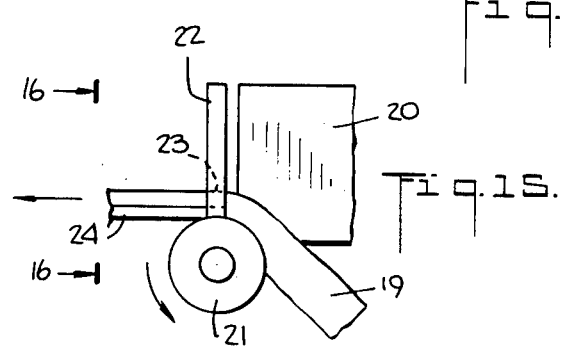
FIG. 15 is a schematic, framentary view of still other apparatus utilized for fabricating one form of the liner of the present invention.
Figure 16:
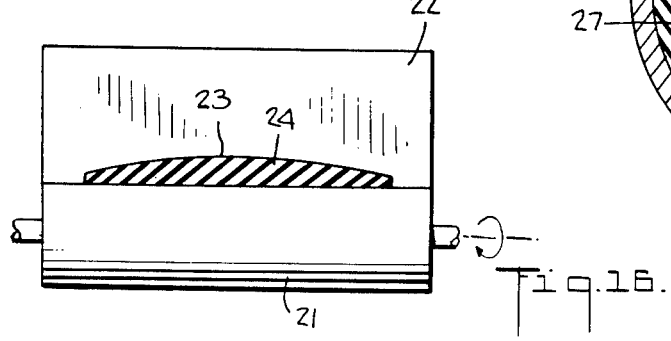
FIG. 16 is a frontal view of the apparatus illustrated in FIG. 15.

A form of apparatus which may be utilized for fabricating the liners 1A, 1B, 1C, 1D or 1E is illustrated generally schematically in FIG. 15. In this respect, uncured, elastomeric stock 19 may be wedged (for example, by extrusion or the like) between a stationary surface 20 spaced from a calendering roll 21 and then between a stationary die-blade 22 confronting and spaced from the roller 21. The die-blade 22 may be provided with a contoured shaping edge 23 (FIG. 16) to impart the appropriate convexity to the stock 19 as it issues from the apparatus in the form of an elongate sheet 24. Such apparatus is more fully discussed in co-pending U.S. patent application Ser. No. 308,161, filed on Nov. 20, 1972, the subject matter of which is incorporated by reference herein.

Figure 17:
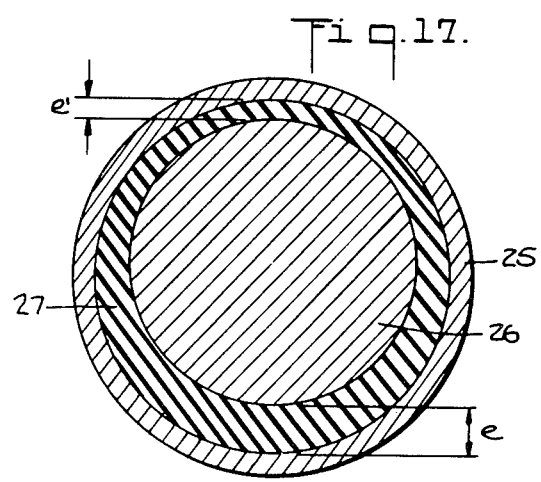
FIG. 17 is a cross-sectional view of still further apparatus for forming the liner of the present invention.

Another form of apparatus for fabricating a convex or contoured liner 1 is illustrated in cross-section in FIG. 17. The latter apparatus includes an outer sleeve 25 in the form of a cylinder and relative to which is eccentrically arranged an inner cylindrical mandrel 26. Elastomeric stock may be forced through the eccentric clearance between the mandrel 26 and the outer sleeve 25, such as for example by extrusion or the like, and will issue from the apparatus in the form illustrated in cross-section at 17. The lower portion will display a thickness $e$ which is substantially greater than the thickness $e'$ vertically opposite it. The cylindrical-like product issuing from the apparatus may then be severed at the thinner region $e'$ thereof for association with the bead regions of the carcass to be fabricated.

Despite the form of convexity of the liners pursuant to the present invention, the convexity is adapted to overcome the disadvantages associated with the reduction in thickness that the liner and the carcass undergo during inflation thereof from a cylinder to a torus, thereby strengthening the liner and preventing air-leakage therethrough.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. A method of fabricating a pnuematic tire, comprising:
    a. forming an elastomeric, bead-reinforced, annular body;
    b. forming an air-impervious, symmetrically convex, elastomeric liner for said body from a thermoplastic material so as to be coextensive with said body from bead-to-bead and present a convex surface that is thickest along the medial region of said liner;
    c. forming on said convex surface of said liner an array of recesses each communicating one edge of said liner with a second edge;
    d. superposing said liner co-extensively upon and affixing it to an internal surface of said body such that said liner recesses are exposed and said convex surface is annularly symmetrical;
    e. inflating and vulcanizing said body and liner together by engaging a smooth surface of an inflatable medium with said convex surface in a heated mold;
    f. venting fluid from between said liner and said inflatable medium via said recesses; and
    g. treating an deforming the surface of said liner in which are presented said recesses such that the latter gradually disappear to merge smoothly with the remainder of said surface and present respective spaced striation marks evidencing their previously recessed condition and said convex liner is rearranged into a uniformly thick liner from bead-to-bead of said body concomitantly with said steps of inflation, vulcanization and fluid-venting.

2. A method as claimed in claim 1, including forming said recesses such that each is spaced from an adjacent recess through the intermediary of an elongate rib thermally deformable under pressure.

3. A method as claimed in claim 2, including forming said recesses in parallel relation and obliquely of a median equatorial plane of said body.

* * * * *